United States Patent [19]

Czich et al.

[11] Patent Number: 4,709,789
[45] Date of Patent: Dec. 1, 1987

[54] DUST COVER FOR CYLINDRICAL ELEMENTS OF THE TYPE FOR USE IN A PIN GUIDE ARRANGEMENT OF A SPOT-TYPE DISC BRAKE

[75] Inventors: Erhard Czich, Eppstein/Bremthal; Peter Drott, Frankfurt am Main; Horst Haefner, Steinbach, all of Fed. Rep. of Germany

[73] Assignee: Alfred Teves GmbH, Frankfurt am Main, Fed. Rep. of Germany

[21] Appl. No.: 855,079

[22] Filed: Apr. 22, 1986

[30] Foreign Application Priority Data

Apr. 22, 1985 [DE] Fed. Rep. of Germany ....... 3514497

[51] Int. Cl.⁴ ...................... F16D 65/09; F16D 65/02
[52] U.S. Cl. ................................ 188/73.44; 74/18.2; 277/212 FB
[58] Field of Search ............... 188/73.44, 73.45, 73.32, 188/72.4, 72.5, 264 G, 369-370, 322.16, 322.17; 277/30-31, DIG. 4, 237 A, 212 FB, 212 C, 212 R, 93 R, 81 R, 88, 89, 166; 74/18.2; 92/168; 403/50-51; 464/173

[56] References Cited

U.S. PATENT DOCUMENTS

| Re. 29,582 | 3/1978 | Brown ................................ 188/73.3 |
| 2,305,265 | 12/1942 | Tourneau ...................... 277/212 FB |
| 2,397,464 | 4/1946 | Booth ...................................... 287/90 |
| 2,842,230 | 7/1958 | MacPherson .................. 188/322.16 |
| 3,403,932 | 10/1968 | Kutcher .................... 277/212 FB X |
| 4,220,418 | 9/1980 | Kondo et al. ............. 277/212 FB X |
| 4,570,760 | 2/1986 | Schmidt ........................... 188/73.44 |

FOREIGN PATENT DOCUMENTS 2510037 9/1975 Fed. Rep. of Germany ... 188/73.45
2953656 8/1979 Fed. Rep. of Germany .
2919075 1/1980 Fed. Rep. of Germany .
2926407 1/1980 Fed. Rep. of Germany .
3219030 11/1983 Fed. Rep. of Germany .
3326482 1/1985 Fed. Rep. of Germany .
 500512 2/1939 United Kingdom .
1117174 6/1968 United Kingdom .
2054096 2/1981 United Kingdom .
2122277 1/1984 United Kingdom .
2158891 11/1985 United Kingdom ......... 277/212 FB
2158892 11/1985 United Kingdom ......... 277/212 FB

OTHER PUBLICATIONS

Japanese Abstract, M-195, Feb. 22, 1983, vol. 7, No. 44, 57-192634, Kuramoto.
Japanese Abstract, M-40, Nov. 11, 1980, vol. 4, No. 16, 55-109834, Hirashita.
Antriebstechnik, 20, 1981, Nr. 6, S.278.

Primary Examiner—Douglas C. Butler
Attorney, Agent, or Firm—James B. Raden; Robert P. Seitter

[57] ABSTRACT

A dust cover for cylindrical elements, in particular for a pin guide arrange of a spot-type disc brake is described and includes an elastic folded sleeve having a first end section fixable at the circumference of a first cylindrical element provided in the brake housing and a second section mounted at the circumference of a second cylindrical element with a ring which is seated on the second cylindrical element. The ring has a substantially U-shaped configuration in longitudinal section and is firmly positioned on the second cylindrical element and partly surrounds the second end section of the folded sleeve. The second end section of the sleeve is turnable inside the ring.

5 Claims, 2 Drawing Figures

DUST COVER FOR CYLINDRICAL ELEMENTS OF THE TYPE FOR USE IN A PIN GUIDE ARRANGEMENT OF A SPOT-TYPE DISC BRAKE

This invention is related to a dust cover for cylindrical elements and in particular a dust cover for a pin guide arrangement of a spot-type disc brake.

A dust cover of this kind is known from the German printed and published patent application No. 32 19 030 A1. In the dust cover described in that application a metal ring which is rotatably positioned on a guide pin with a sliding fit, is fastened radially internally to an end section of a boot. At the end section on a side of the metal ring facing the point of fixation a ring sealing lip is provided in sealing engagement with the guide pin and a circular front sealing ring is provided on the front side. On the side facing away from the ring sealing lip, the metal ring is in abutment against a step formed by the pin. While this arrangement for the most part allows the brake housing to swing open without any distortion of the boot some problems now and then arise during operation whereby the end section of the boot which is seated on the guide pin can be damaged.

SUMMARY OF THE INVENTION

The present invention is concerned with providing for an improved dust cover which avoids damage to the dust cover during operation. According to a preferred embodiment of the invention, there is provided a dust cover for cylindrical elements, in particular for a pin guide type arrangement of a spot-type disc brake, which is simple in design and cost effective to manufacture and which minimizes damages to the cover.

According to an important feature of the invention the dust cover is prevented from slipping off of the cylindrical element on which it is seated and a better seating of the dust cover is ensured. The penetration of dirt under the dust cover when unfastening the guide pin is avoided.

Typically, guide systems for spot-type disc brakes comprises two guide pins, and another important feature of the invention provides for the inventive dust cover to be provided at both of the guide pins.

A further feature of the invention provides for the guide pins to comprise a hollow guide bushing which is secured to the brake carrier or to the brake housing by means of a screw passing through the bushing. The guide bushings provide for easy installation. According to a still further important aspect of invention, pin and the guide bushing provide for lower manufacturing as compared to prior art arrangements.

According to a preferred embodiment of the invention, it is envisaged that on one side, the ring is formed with an extended lateral wall presenting an end portion which surmounts at least partly the end section of the folded sleeve, the end portion extending preferably at an angle with respect to the longitudinal axis of the ring between about 10° to 70°. In this manner, still better protection of the folded sleeve, especially at its end section, is attained in operation.

With the first end section of the folded sleeve seated in a cylindrical recess provided in the guide attachment of the brake housing as envisaged in accordance with the preferred embodiment of the invention, the opening formed by that recess will be substantially closed off by the extended lateral wall of the ring.

BRIEF DESCRIPTION OF THE DRAWINGS

The invention will be better understood after a reading of the following detailed description of the Preferred Embodiment of the Invention made with reference to the accompanying drawing, in which.

BRIEF DESCRIPTION OF THE PREFERRED EMBODIMENT

Figure 1:
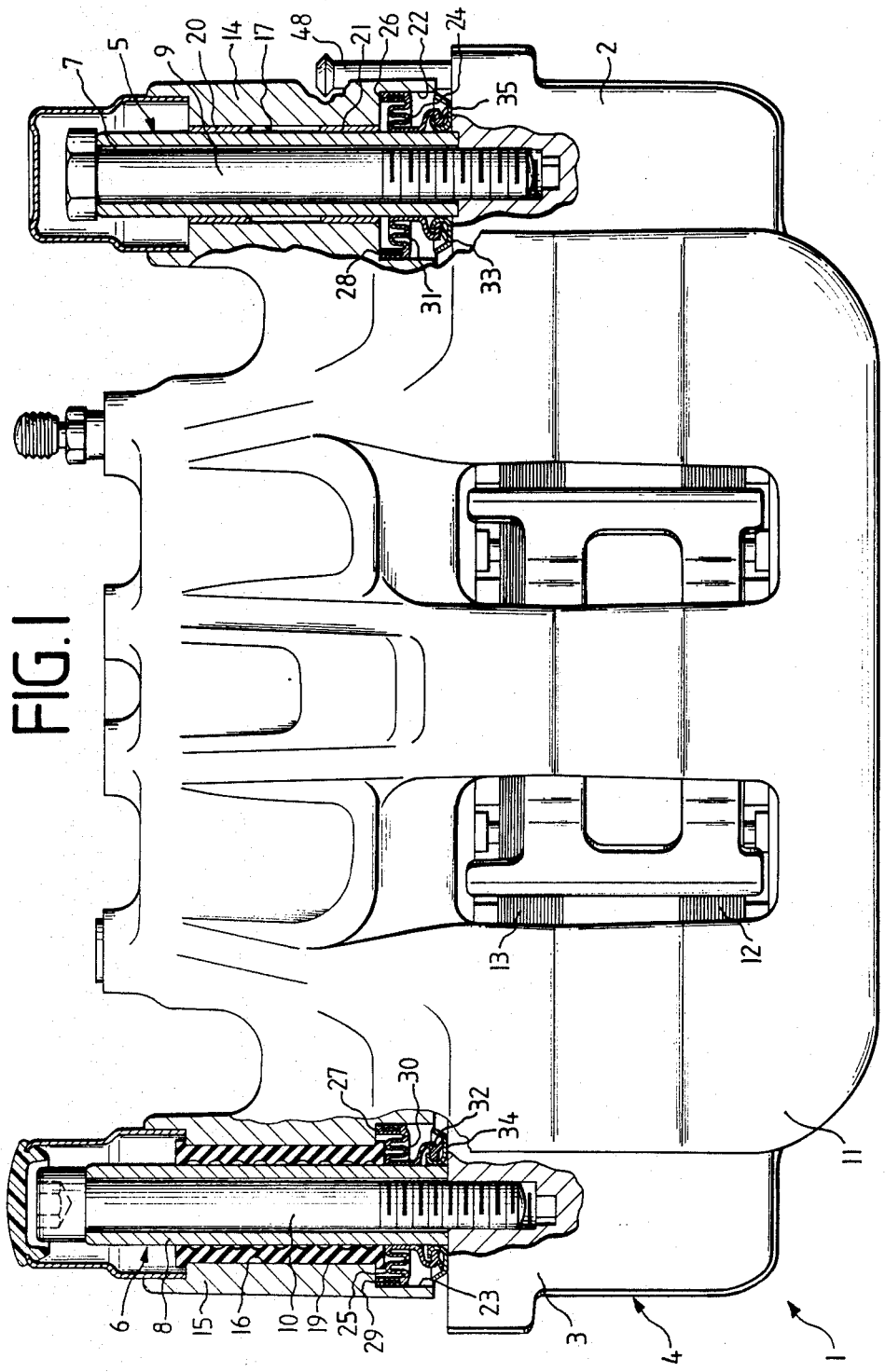
FIG. 1 is a top plan view of a spot-type disc brake showing details of construction; and, FIG. 2 is an enlarged longitudinal cross sectional view of the pin guide arrangement of the spot-type disc brake illustrated in FIG. 1. showing details of construction.

In a spot-type disc brake 1 illustrated in the drawing, axial guide pins 5, 6 are coupled to two support arms 2, 3 of a brake carrier 4. The support arms 2, 3 are positioned at a distance from each other in a circumferential direction relative to the brake disc, not shown. The axial guide pins 5, 6 each include a guide bushing 7,8 through which a screw 9, 10 is passed. The screws 9, 10 are provided with threaded sections which are screwed into corresponding mating threads in the brake carrier 4. In the fixed condition, the heads of said screws 9, 10 press against the related front sides of the guide bushings 7, 8, so that the bushings are clamped between the head of the related screw and the support arm.

Between the support arms 2, 3 of the brake carrier 4, a brake housing 11 is arranged which presents a substantially U-shaped cross-section and which straddles a brake disc (not shown in the drawing). Brake linings 12, 13 are positioned on either side of the brake disc which, are also straddled by the brake housing 11. In one stem of said brake housing 11, an actuating device (not shown in the drawing) such as a hydraulically operated piston and cylinder is disposed which acts directly on the one brake lining and indirectly, by way of the brake housing, on the other brake lining in order to urge the brake linings against the brake disc. An axial shift of the brake housing 11 is necessary for this purpose and is attained by the guide arrangement. To this end, the brake housing 11 is formed with two lateral attachments 14, 15 which are each provided with an axial bore 16, 17. The axial bores 16, 17 are sized such that an annual interstice remains between the bores and the axial guide pins 5, 6 which pass through them. In the annular interstice formed by the axial bore 16, a rubber bushing 19 is located which is provided with flanges at its ends which axially retains the bushing 19 axial bore 16 against movement. This guide forms a movable bearing owing to the elastic flexibility of the rubber bushing 19 in the radial direction. In the annular interstice formed by the axial bore 17, two metal guide sleeves 20, 21 are arranged which surround the axial guide pin substantially without play, as a result whereof a fixed bearing is formed on this side of the brake.

Figure 2:
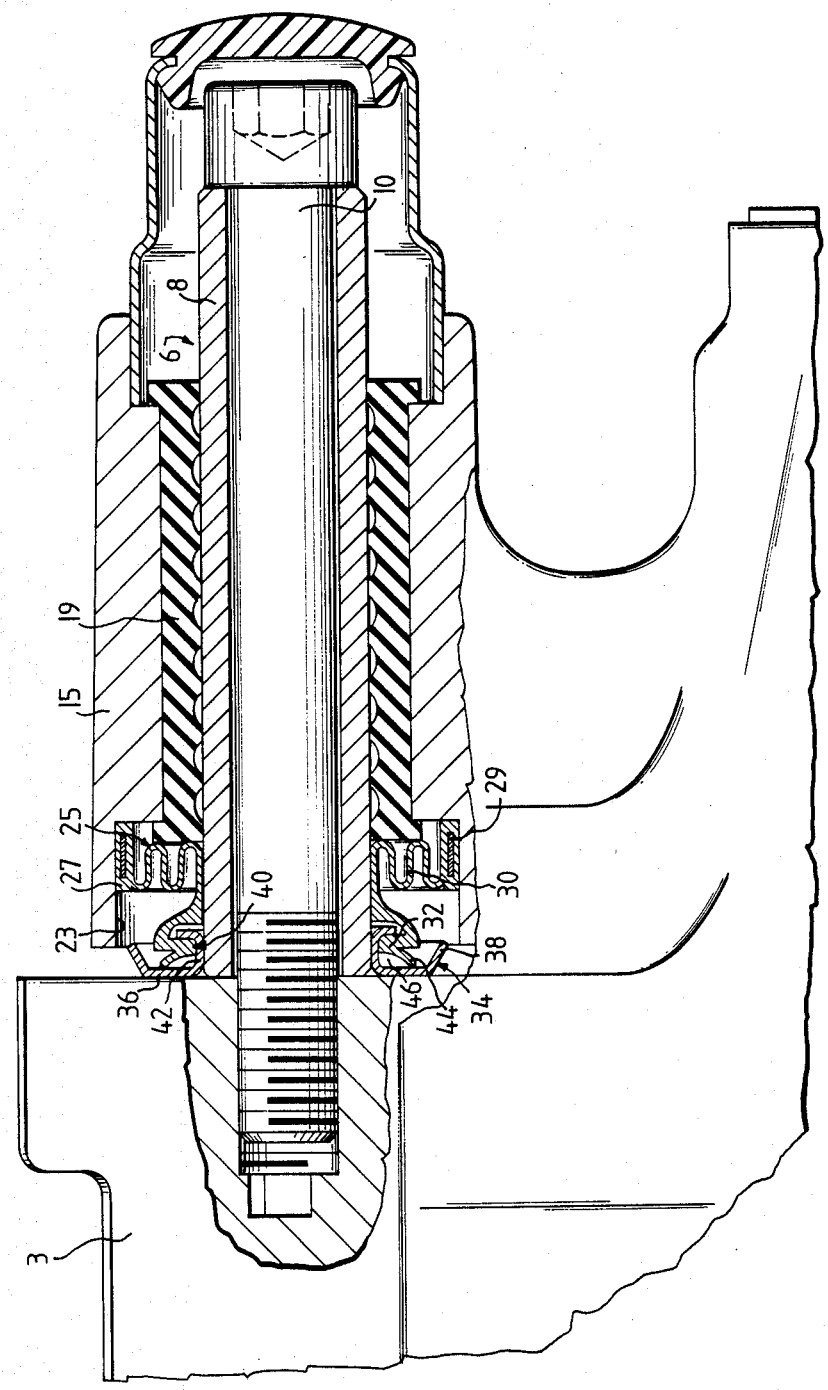

As illustrated best in FIG. 2, in regard to the axial guide pin 6, cylindrical recesses 22, 23 being open in the direction of the brake carrier 4 are provided in the attachments 14, 15. Dust covers 24, 25 are arranged in the recesses 22, 23 and are each fastened by means of one of the end sections 26, 27 of their folded sleeves. The end sections 26, 27 are provided with reinforcement rings 28, 29 which are completely embedded in the elastic material of the dust cover. The end sections 26, 27 are positioned within the recesses 22, 23 with a preload. Folded sections 30, 31 are provided juxtaposed to the end sections 26, 27. The folded sections 30, 31 are succeeded by end sections 32, 33. The end sections 32, 33 are received in metal rings 34, 35 which are seated on the guide bushings 7, 8 with a force fit. The metal rings 34, 35, of which only the ring 34 will be described in the following because of their identical configuration, present a substantially U-shaped longitudinal section, one of the lateral walls 36 of the rings being radially outwardly extended and forming an end section 38 which is bent over at least partly across the U-shaped range defined by the lateral wall. The bent end sections 38 extend at an angle relative to the longitudinal axis of the rings, and may have different inclinations, preferrably ranging between about 10° to 70°. The extended lateral walls 26 of the metal rings 34, 35 are in abutment against the support arms 2, 3 of the brake carrier 4. The range of abutment will be kept free of dirt due to the sheet or plate metal ring being snugly abutted against the brake carrier. The end sections 32, 33 of the dust cover 24, 25 form a radially inwardly pointing sealing lip 40 which interacts with the base section 42 of the related ring, and an axially projecting sealing lip 44, which is defined by a V-shaped or U-shaped notch in that part of the end sections which are positioned radially outwardly. The sealing lip 44 interacts with the extended lateral walls 36 of the rings 34, 35. Spaces 46 remain free in each instance between the sealing lips 40 and 44 which latter are bounded by substantially U-shaped recesses. The end sections 32, 33 are accommodated in the metal rings 34, 35 in such a manner that they can be turned relative to the rings.

When, for example, the brake linings are to be changed, the brake housing 11 of the illustrated disc brake can to be swung open easily. First, the screw 10 of the movable bearing is unscrewed from the support arm and pulled out of the guide bushing 8. Since the metal ring is firmly seated on the guide bushing 8, the guide bushing will be axially slidable within the rubber bushing 19 only to a limited extent and will, therefore, be retained undetachably in the rubber bushing 19. During the subsequent opening up of the brake housing 11, the end section 33 of the dust cover 24 can be turned inside the metal ring 35. Since the end section is protected inside of the metal ring, damages thereto to a large extent be avoided during this motion. Also, corrosion is largely prevented with this arrangement. In order to limit the swivelling motion of the brake housing 11, an axially extending peg 48 is provided at the support arm 2 of the brake carrier 4, against which a pertaining part of the brake housing 11 will abut in the open condition. When the brake housing is being swung closed, the section 38 of the sheet or plate metal ring which is angled will, in addition, act as a protective fender.

What is claimed is:

1. A dust cover for use in a pin guide arrangement of a spot-type disc brake, comprising an elastic folded sleeve having a first end section including means adapted to be stationarily, sealingly received against a first cylindrical element associated with an attachment member of said pin guide arrangement and a second end section including means adapted to be rotationally, sealingly mounted to the circumference of a second cylindrical element of said pin guide arrangement including a ring providing at said second end section, said ring being a substantially U-shaped configuration in longitudinal section an inner diametrical portion of said ring adapted to be stationarily mounted on said second cylindrical element, said ring at least partly surrounds said second end section of said folded sleeve, and said second end section being sealingly, rotatably mounted inside the U-shaped portion of said ring, an outer diametrical portion of said ring adapted to abut against said first cylindrical element.

2. The dust cover as claimed in claim 1, wherein said ring includes an extended lateral wall having an end portion which at least partly surrounds said second end section of said folded sleeve.

3. The dust cover as claimed in claim 2, wherein said end portion of said lateral wall extends at an angle with respect to the longitudinal axis of said ring between about 10° to 70°.

4. The dust cover as claimed claim 1 wherein said second end section of said folded sleeve forms a sealing lip which is in abutment against said extended lateral wall of said ring.

5. The dust cover as claimed in claim 1 wherein said first end section of said folded sleeve includes a ring-shaped reinforcement member.

* * * * *